Figure 9:
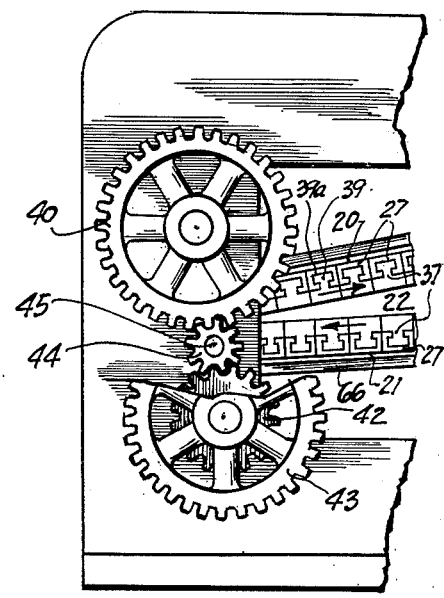

Oct. 14, 1952      A. E. WILLOMITZER      2,613,619
MULTIPLE MOLD CONTINUOUS PLASTIC FORMING MACHINE
Filed Feb. 1, 1947      3 Sheets-Sheet 1
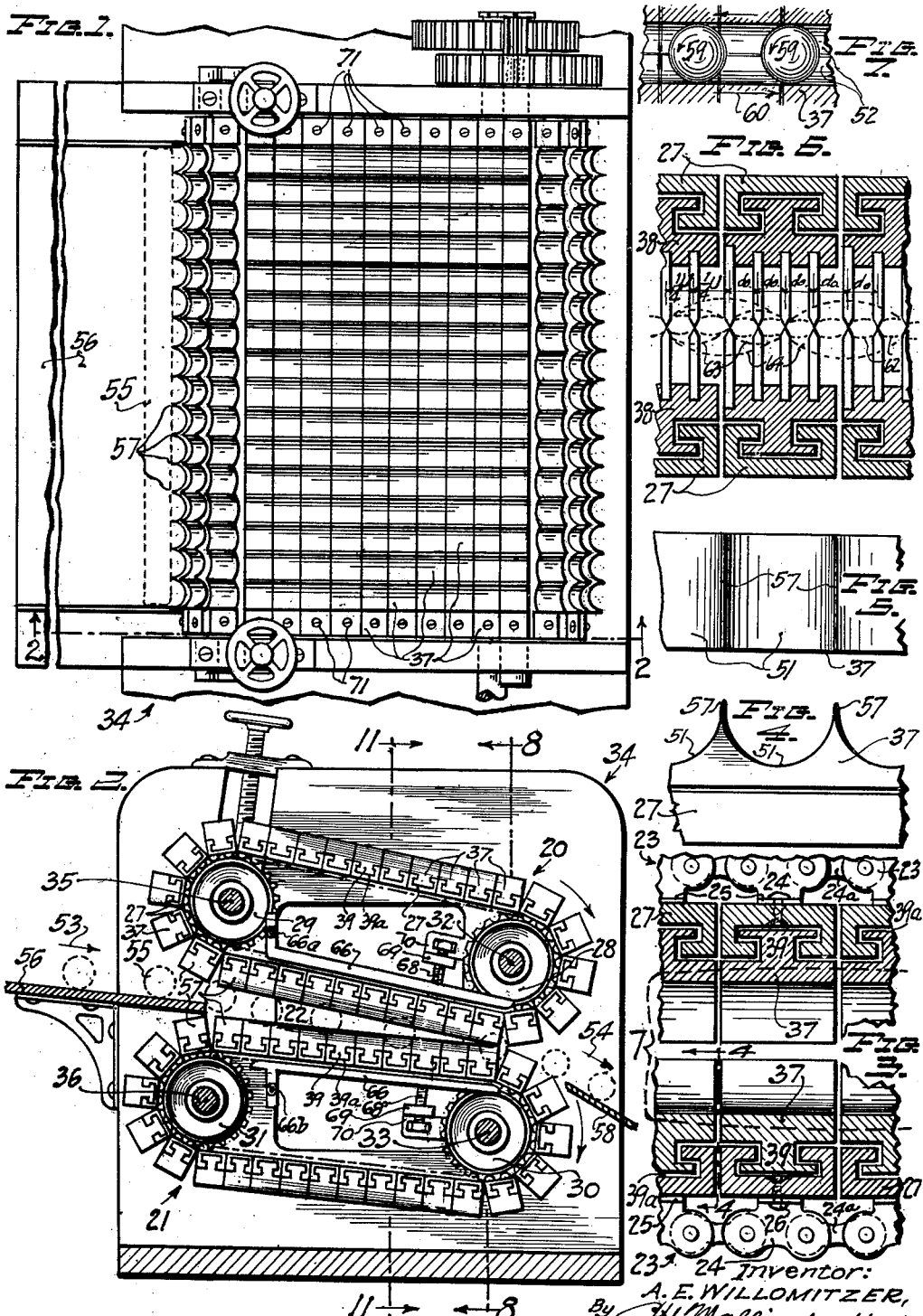

Inventor:
A. E. WILLOMITZER,

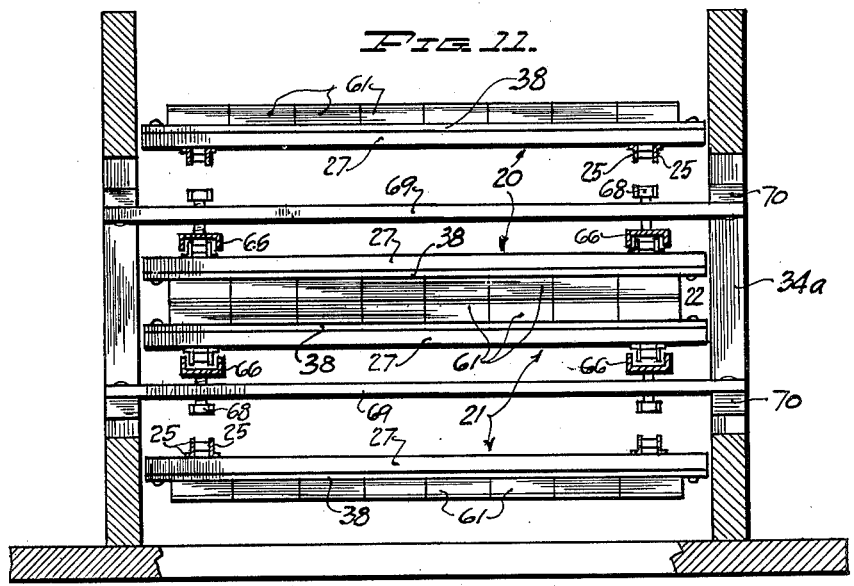
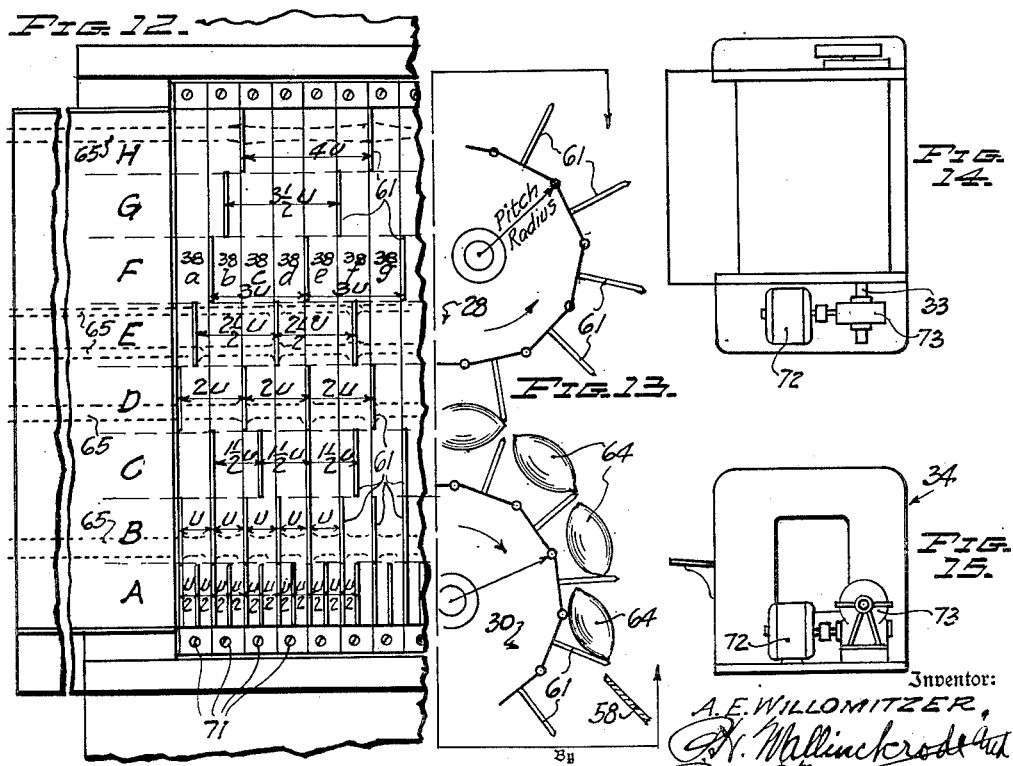

Patented Oct. 14, 1952

2,613,619

UNITED STATES PATENT OFFICE 2,613,619

MULTIPLE MOLD CONTINUOUS PLASTIC FORMING MACHINE

Adolf E. Willomitzer, Salt Lake City, Utah

Application February 1, 1947, Serial No. 725,858

2 Claims. (Cl. 107—20)

This invention relates to a continuous multiple-mold plastic forming machine and more particularly to such a machine adapted to the shaping of candies, although it is not necessarily so restricted.

Among the principal objects of the invention are:

(a) To provide means for speedily forming plastic material continuously into given shapes, such as candy kisses, balls and the like.

(b) To make possible the shaping of an endless variety of candies in a single machine by simply interchanging a series of different mold elements fitted into a traveling chain means.

(c) To provide a machine that is simple, relatively inexpensive and easy to keep clean.

(d) To change molds quickly from one type to another.

(e) To form any different shapes of the same type by one setting of molds.

Other important objects will become evident as the following description progresses.

According to the invention in its broad aspect, a forming deck is provided, which comprises two traveling molding surfaces spaced a suitable distance apart from each other. These molding surfaces are capable of forming an almost infinite number of different shapes varying from angular pieces to those of rounded configuration, such as bodies of revolution. In order to produce the required variety, the two traveling surfaces at one time move in the same direction at the same speed, while at another time these surfaces can be made to move at different speeds and preferably in opposite directions. Each traveling surface is preferably composite in character, that is to say, made up of a plurality of individual consecutive members closely adjacent one another, this being true whether angular pieces or bodies of revolution are to be formed.

For convenience the two molding surfaces may be regarded one as a floor surface, and the other as a ceiling surface. Projecting inwardly of the forming deck from each molding surface is a plurality of individual cutting and shaping members, the shaping members of the ceiling surfaces being adapted to cooperate with corresponding shaping members of the floor surface in performing the molding operation upon the plastic material passing through the molding deck. The traveling function is important in that it is responsible for the continuous performance character of the apparatus of the invention.

Advantageously, the molding floor consists of the upper run of a traveling conveyor while the molding ceiling consists of the lower run of a second traveling conveyor, the two conveyors being suitably intergeared with each other to keep the relative movements thereof in step as may be required.

Each conveyor preferably comprises an endless flexible connector running over spaced apart rotatable elements in a manner that is well known, the flexible member, for example, being an assemblage of sprocket chains, flights and molding means. The two conveyors are arranged one above the other so that the contiguous portions thereof constitute the respective ceiling and floor surfaces aforesaid. The sprocket chains are advantageously made up of attachment links on which are mounted certain foundation flights suitably grooved to receive a series of detachable mold elements that can be varied indefinitely. When making certain kinds of candy, such as kisses or pillows, the contiguous conveyor surfaces travel in the same direction and at the same speed, but at other times, when making bodies of revolution, these contiguous surfaces travel in mutually opposed directions and at different speeds.

Ordinarily candy is cooked and prepared in "batches" and after being "spung" is variously formed. To the candymaker "spinning" means stretching a batch into lengths or ropes of the desired cross-section. The lengths of the ropes vary according as to whether balls or kisses are to be made—short lengths for balls and indefinitely long lengths for kisses or pillows. For kisses, blades extend transversely of the machine to cut the spun lengths into short pieces simultaneously with forming the same, the ropes being fed into the forming deck longitudinally. For balls and other bodies of revolution, the spun short lengths are fed into the machine transversely thereof and are rolled into shape and cut simultaneously.

Figure 10:
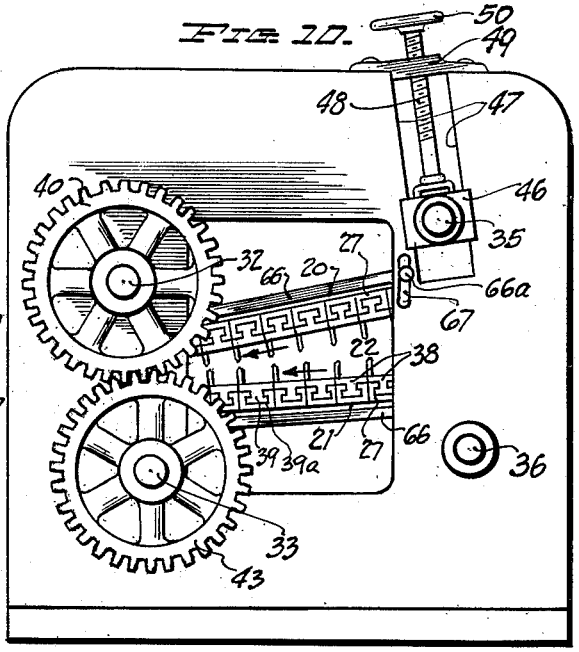
Figure 8:
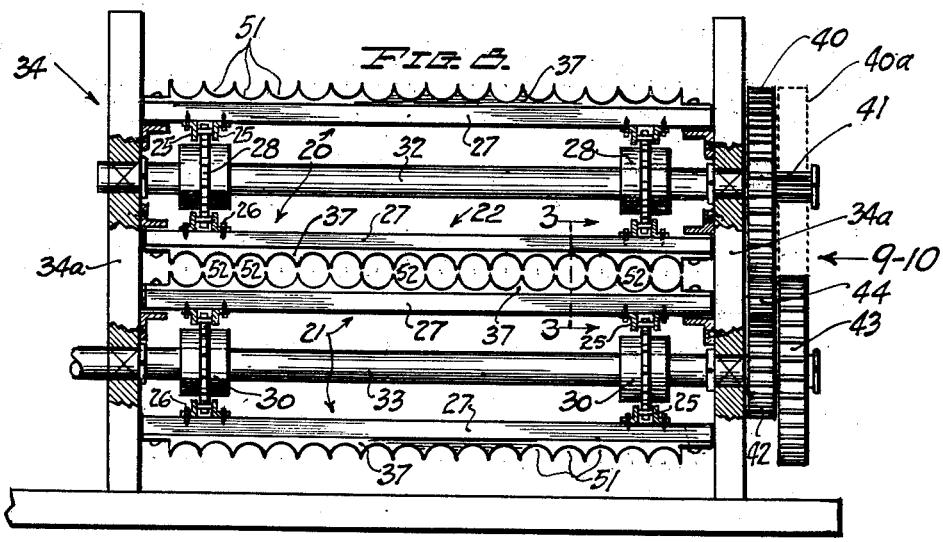

In the accompanying drawings which illustrate one embodiment of the invention,

Fig. 1 represents the plan, portions being broken away for convenience, showing one type of multiple molds, namely the body-of-revolution type;

Fig. 2, a nearside elevation, partially in section, taken on the line 2—2 in Fig. 1;

Fig. 3, a fragmentary vertical section taken on line 3—3 in Fig. 8, drawn to an enlarged scale;

Fig. 4, a fragmentary elevation looking from the line 4—4 in Fig. 3;

Fig. 5, a plan corresponding to Fig. 4;

Fig. 6, a fragmentary vertical section similar to the one shown in Fig. 3, but illustrating molding members of a different kind;

Fig. 7, approximately the portion embraced by the broken line 7 in Fig. 3, drawn to a reduced scale and illustrating balls of plastic material in the process of formative rolling;

Fig. 8, a vertical section taken on the line 8—8 in Fig. 2, certain parts in the background being omitted;

Fig. 9, a fragmentary side elevation looking in the direction of the arrow 9—10 in Fig. 8, the machine being equipped for a body-of-revolution product;

Fig. 10, a side elevation looking in the direction of the arrow 9—10 in Fig. 8, the machine however, being equipped for forming an angular product of plastic material rather than a body-of-revolution product of Fig. 9;

Fig. 11, a vertical section taken on the line 11—11 in Fig. 2, certain parts in the background being omitted;

Fig. 12, a fragmentary plan of the molding deck seen from the line 12—12 in Fig. 10; or in other words, at the level 10 in Fig. 11, certain parts in the background being omitted;

Fig. 13, a fragmentary diagram drawn to a scale considerably enlarged to show the manner of discharging the product such as candy pillows;

Fig. 14, a plan in outline drawn to a reduced scale, and showing the machine equipped with an electric motor drive; and Fig. 15, a nearside elevation corresponding to Fig. 14.

Referring to the drawings, and more especially first to Figs. 2 and 8 to 11, the numeral 20 denotes an upper conveyor and the numeral 21 a lower conveyor, the two conveyors being cooperatively disposed to constitute a molding deck 22 adapted to turn out candy products of different kinds. Each conveyor comprises a pair of sprocket chains 23 consisting preferably of so-called attachment links 24 that have the oppositely extending lugs 25. Fastened to the lugs by any suitable means, such as screws 26, are flights 27 that extend transversely of the respective pairs of sprocket chains 23, as shown for example, in Figs. 8 and 11. In the present instance, the chains 23, 23 of the upper conveyor pass around driver sprocket wheels 28 and around idler wheels 29, while the sprocket chains of the lower conveyor similarly pass around driver sprocket wheels 30 and around idler wheels 31.

At 32 and 33 are drive shafts on which the respective upper sprocket wheels 28 and lower sprocket wheels 30 are fast, the respective drive shafts being journaled for example, in suitable side members 34a of a framework 34. At 35 and 36 are idler shafts on which the respective upper wheels 29 and lower wheels 31 are mounted. Both idler shafts are suitably supported in the side members 34a.

The molding means of the invention comprises selectively separable members that are interchangeably mounted on or that engage the conveyor flights 27. The separable members as herein shown, consist advantageously of bars that are in substantial longitudinal alignment with the respective flights, and obviously extend transversely of the respective conveyors.

The molding bars in general, are of two typically different kinds—one, illustrated principally at 37 in Figs. 1, 2, 3, 8 and 9, for forming the body-of-revolution products, and the other, illustrated principally at 38 in Figs. 6, 10, 11 and 12, for forming the angular configuration products. Engagement between the flights 27 and both types 37 and 38 of molding bars, can be effected in various ways, for example, by means of T-shaped projecting portions that interlock with correspondingly T-shaped slotted portions. In this instance the T-portions 39 are on the respective molding bars and the slots are in the flights 27, the slots being numbered 39a.

In order that the cooperating molding members of the two conveyors shall be moved as required, the drive shafts 32 and 33 are appropriately inter- geared with each other. Accordingly a spur gear 40 is splined at 41 on the shaft 32 so it can be moved into the dotted position 40a when necessary, or back again. Two spur gears 42 and 43 are fast on the shaft 33, and an idler gear 44, rotatable on a pin 45, is in mesh with both the gears 40 and 42. In this instance the diameter of gear 42 is advantageously half that of gear 40. Hence rotation of shaft 33 drives shaft 32 at half its own speed, but in the same direction. This 1 to 2 ratio, however, is subject to considerable variation. The gear 43 has the same diameter as gear 40. Therefore, when gear 40 is moved into the position 40a, it will mesh with gear 43 and will be driven in the opposite direction from gear 43, but at the same speed.

The idler shaft 35 is adjustable up and down by means of bearings 46 that are slidable in guides 47, the bearings being engaged by a threaded stem 48 that screws through a strap 49, the stem being fast in a handwheel 50.

Body-of-revolution molding bars typified at 37, Fig. 8, are susceptible of being profiled in an endless number of different ways, depending upon individual desires. In this instance the configuration of each bar, by way of illustration, includes a plurality of substantially semicircular scallops 51 adjacent one another, the respective upper and lower bars being in vertical registry with each other, whereby the two series of scallops of the consecutive bars along the molding deck cooperate to form rollways or tunnels 52 that extend from the feed end 53, Fig. 2, to the discharge end 54. Now, considering the driving gears to be selectively arranged according to Fig. 8, as previously explained, and the lower scallops of the rollways 52 to be traveling from feed to discharge at a given rate, then the supper scallops will travel in the opposite direction at one-half the linear velocity of the lower scallops. If a spun, short roll of plastic candy, placed as indicated at 55, on a feed table 56, is pushed into the molding deck, it is grasped and cut into short pieces by the ridges 57. These pieces are then squeezed through the respective rollways, all as indicated by the dotted circles in Fig. 2. The travel difference between the upper and lower scallops causes the pieces to be molded into balls and to be discharged from the deck onto a receiving apron 58. Obviously, cylindrical, hour-glass, ellipsoidal, and many other shapes suggest themselves. In Fig. 7, the ball molding operation is clearly indicated. The balls rotate in the direction of the arrows 59 and are propelled along the moldway in the direction of arrow 60.

Molding bars for products of more or less angular configuration are typified in general at 38 in Figs. 6, 10, 11 and 12. These bars also are subject to endless variation but function differently from the molding bars 37, just described, in that the spun ropes are fed in the direction of travel of the molding floor instead of transversely thereof. The simple characteristic arrangement in Fig. 12 is indicative of the diversified utility of this phase of the invention. Here, relatively short blades 61 project into the molding deck 22 from the molding floor, and in reverse cooperating order from the molding ceiling. It will be noticed that the blades are differently grouped along the lengths of the successive molding bars 38 according to the sub-designations a to g. The series a to g is repeated as determined by the lengths of the respective conveyor chains. In Fig. 12, the possibilities of the spacings of the blades across the width of the bars 38 is exemplified. Assuming the spacing "U" as unity, the other spacings are U/2 and from 1½U to 4U. In Fig. 6, another spacing is U/4, so that the dotted outlines 62 represent the molding of candy kisses or pillows of U/4 size; dotted outlines 63, U/2 size; and dotted outlines 64, U-size. The diagram, Fig. 13, indicates pieces of U-size being discharged from the molding deck. It is to be noticed that the radial positions assumed by the blades when the conveyor chains round the sprocket wheels 28 and 30 spread apart at the tips and have a tendency to break the pieces 64 apart one from another before discharging them on apron 58.

The spun ropes used in molding the shapes just described are fed into the various molding channels A to H, Fig. 12, as indicated for example by dotted lines 65, there being as many channels in use at one time as may be convenient; several ropes may be fed into one channel. By spinning the ropes to smaller or larger diameters the sizes of the resulting pieces may be further varied. Spun ropes may tend to force the floor and ceiling apart. This is counteracted by slideways 66, pivoted respectively on spanning pivot bars 66a and 66b, bar 66a being adjustable in slots 67, Fig. 10. The swinging end of each slideway is adjustable by means of a screw 68, Figs. 2 and 11, threaded in a respective spanner beam 69 that is supported on respective lugs 70 that project from the framework. The proximity of the tips or ridges of the upper and lower molding bars to each other is adjusted by means of the handwheels 50.

It is advantageous to make every other link in the sprocket chain an attachment link 24 as in Fig. 3, and to connect these together by means of non-attachment links 24a.

Both kinds of molding bars 37 and 38 are interchangeable as hereinbefore referred to, and are fastened to the respective flights 27 by any suitable means, such as screws 71, Figs. 1 and 12.

Motion is transmitted to the drive shaft 33 from any convenient source, such as an electric motor 72 interconnected with a worm gear speed reducer 73, Figs. 14 and 15. The speed at which the molding deck travels, and the length thereof, are coordinated so that material having a certain degree of plasticity when it is fed into the molding deck shall have said degree of plasticity appreciably reduced when said material is discharged from said molding deck. The speed of travel of the molding deck may be selectively varied from time to time in any well known way, a simple one being to use a variable speed motor at 72.

It is to be observed that the terms forming deck, molding surfaces, traveling surfaces, floor surface, ceiling surface, molding bar, molding flight, and so on, are to a considerable extent synonymous one with another, but broadly, all are included in "molding means." Each flight 27 with its molding bar 37 or 38, as the case may be, constitutes a duo that may be referred to as a "molding flight."

The fact that the blades 61 in Figs. 11 and 12 are shown all of approximately the same length is merely a matter of convenience, since the intention is to place no restriction whatsoever either on the arrangement or on the size thereof. Instead of blades, molds of various kinds may be used and such molds may have any desired patterns on the surfaces thereof so that these patterns can be impressed on the superficial surfaces of the molded plastic product. Furthermore, the bars 27 may have no blades or molds at all, but have instead any desired patterns engraved directly on the faces of the bars 27, thereby producing a continuous sheet of plastic with the said desired patterns impressed thereon, continuously, when the proper motion is imparted to the molding deck.

While terms more or less specific are used in describing the embodiment of the invention disclosed herein, the scope of the invention is limited only by the terms of the following claims.

Having fully described the invention, what is claimed is:

1. A machine for forming bodies of revolution from plastic material, comprising two endless conveyors arranged one above the other with the lower run of the upper conveyor in operative registry with the upper run of the lower conveyor, the said conveyors having correspondingly formed molding channels running longitudinally therearound in mutually registering relationship to define product-forming tunnel means during operation of the machine; means for driving one of the conveyors in one direction at a given speed; and means for driving the other conveyor in the opposite direction at a different speed.

2. A molding machine, comprising two conveyors in cooperative registry with each other, one of the said conveyors being superposed relative to the other and arranged so that the upper run of the lower conveyor and the lower run of the upper conveyor are in traveling alignment with each other providing a material-feed entrance extending uninterruptedly across the widths of said conveyors, the said conveyors including elongate mold flights extending transversely of the direction of conveyor travel; form bars removably attached to respective mold flights so as to extend longitudinally therewith; upstanding ridges arranged transversely of said form bars so said ridges in transversely spaced association with one another serve to at least partially define forming tunnels longitudinally of the conveyors, said ridges defining concavely scalloped molding surfaces for the respective mold bars wherein the concave scallops of the upper conveyor register with the respective concave scallops of the lower conveyor to provide said forming tunnels; and means for operating the said conveyors in mutually opposite directions at mutually different rates of speed.

ADOLF E. WILLOMITZER.

REFERENCES CITED

The following references are of record in the file of this patent:

UNITED STATES PATENTS

| Number | Name | Date |
|---|---|---|
| 760,218 | Lefinski | May 17, 1904 |
| 1,216,936 | Brach | Feb. 20, 1917 |
| 1,303,013 | Bainbridge | May 6, 1919 |
| 1,391,805 | Subers | Sept. 27, 1921 |
| 1,465,326 | Zimmer | Aug. 21, 1923 |
| 1,577,922 | Marsa et al. | Mar. 23, 1926 |
| 1,753,834 | Ponisch | Apr. 8, 1930 |
| 2,192,918 | Kohler | Mar. 12, 1940 |
| 2,288,611 | DeWyk | July 7, 1942 |

FOREIGN PATENTS

| Number | Country | Date |
|---|---|---|
| 226,290 | Germany | Feb. 25, 1903 |